US009771895B2

(12) United States Patent
Kramer

(10) Patent No.: US 9,771,895 B2
(45) Date of Patent: Sep. 26, 2017

(54) SEAL ASSEMBLY FOR LINERS OF EXHAUST NOZZLE

(71) Applicant: UNITED TECHNOLOGIES CORPORATION, Hartford, CT (US)

(72) Inventor: George J. Kramer, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 1320 days.

(21) Appl. No.: 13/653,590

(22) Filed: Oct. 17, 2012

(65) Prior Publication Data
US 2014/0102108 A1  Apr. 17, 2014

(51) Int. Cl.
F02C 7/28 (2006.01)
F02K 1/82 (2006.01)

(52) U.S. Cl.
CPC . F02K 1/82 (2013.01); F02C 7/28 (2013.01)

(58) Field of Classification Search
CPC ... F02K 1/805; F02K 1/82; F02C 7/28; F01N 13/1827; F01D 11/00; F01D 11/005
See application file for complete search history.

(56) References Cited

U.S. PATENT DOCUMENTS

| 4,203,286 A | 5/1980 | Warburton |
| 4,706,453 A | 11/1987 | Vivace |
| 5,101,624 A | 4/1992 | Nash et al. |
| 5,222,692 A * | 6/1993 | Glowacki ............. F01D 11/005 244/129.1 |
| 5,249,419 A | 10/1993 | Landhuis |
| 5,509,669 A * | 4/1996 | Wolfe et al. ................. 277/654 |
| 5,535,585 A | 7/1996 | Eichhorn |
| 5,657,998 A * | 8/1997 | Dinc ..................... F01D 11/005 277/653 |
| 5,823,741 A * | 10/1998 | Predmore ............. F01D 11/005 415/134 |
| 5,915,697 A * | 6/1999 | Bagepalli ............. F01D 11/005 277/627 |
| 5,934,687 A * | 8/1999 | Bagepalli et al. ............. 277/637 |
| 6,199,871 B1 * | 3/2001 | Lampes ........................ 277/614 |
| 6,431,825 B1 * | 8/2002 | McLean ........................ 415/135 |
| 7,316,402 B2 * | 1/2008 | Paauwe ....................... 277/641 |
| 7,334,800 B2 * | 2/2008 | Minnich ....................... 277/644 |
| 7,448,851 B2 | 11/2008 | Bolgar et al. |
| 7,527,469 B2 * | 5/2009 | Zborovsky et al. ............ 415/9 |
| 7,581,385 B2 | 9/2009 | Farah et al. |
| 7,770,401 B2 | 8/2010 | Nicholls |
| 7,784,264 B2 * | 8/2010 | Weaver et al. ............. 60/39.37 |
| 8,075,255 B2 * | 12/2011 | Morgan ................ F01D 11/005 277/614 |
| 8,215,115 B2 | 7/2012 | Adair et al. |
| 8,434,999 B2 * | 5/2013 | Amaral ................ F01D 11/005 415/136 |
| 8,678,754 B2 * | 3/2014 | Morgan et al. ............. 415/138 |
| 8,985,592 B2 * | 3/2015 | Green et al. ................. 277/637 |

(Continued)

Primary Examiner — Phutthiwat Wongwian
Assistant Examiner — Jason H Duger
(74) Attorney, Agent, or Firm — Carlson, Gaskey & Olds, P.C.

(57) ABSTRACT

An exhaust nozzle liner assembly of a gas turbine engine includes a first liner, a second liner spaced from the first liner by a gap, a seal assembly located at least partially within the gap to provide a continuous surface defined by the first liner, the seal assembly and the second liner, and a seal retainer to retain the seal assembly.

24 Claims, 4 Drawing Sheets

(56) References Cited

U.S. PATENT DOCUMENTS

| | | | |
|---|---|---|---|
| 2003/0039542 A1* | 2/2003 | Cromer | 415/135 |
| 2007/0065286 A1 | 3/2007 | Bolgar et al. | |
| 2007/0084217 A1 | 4/2007 | Nicholls | |
| 2009/0139221 A1 | 6/2009 | Farah et al. | |
| 2011/0072830 A1 | 3/2011 | Adair et al. | |
| 2012/0211943 A1* | 8/2012 | Hefner et al. | 277/316 |
| 2013/0104565 A1* | 5/2013 | Casavant | F01D 25/26 60/805 |
| 2014/0062034 A1* | 3/2014 | Lacy | F01D 9/023 277/592 |

* cited by examiner

SEAL ASSEMBLY FOR LINERS OF EXHAUST NOZZLE

BACKGROUND OF THE INVENTION

A gas turbine engine includes an exhaust nozzle. Gas path contours of the exhaust nozzle should be smooth and continuous to minimize performance losses. Hardware of the exhaust nozzle is often segmented due to nozzle geometry, manufacturing limitations, and differences in relative thermal growths and tolerances. Gas path interfaces between liners or a liner to a structure have been employed, but can result in gaps or surface steps.

SUMMARY OF THE INVENTION

An exhaust nozzle liner assembly of a gas turbine engine according to an exemplary embodiment of this disclosure, among other possible things, includes a first liner, a second liner spaced from the first liner by a gap, a seal assembly located at least partially within the gap to provide a continuous surface defined by the first liner, the seal assembly and the second liner, and a seal retainer to retain the seal assembly.

In a further embodiment of any of the foregoing exhaust nozzle liner assemblies, the seal assembly includes a first metal mesh piece and a second metal mesh piece connected by and secured to a support plate located between the first metal mesh piece and the second metal mesh piece.

In a further embodiment of any of the foregoing exhaust nozzle liner assemblies, the support plate is substantially rigid.

In a further embodiment of any of the foregoing exhaust nozzle liner assemblies, a braze material is added to the first metal mesh piece and the second metal mesh piece.

In a further embodiment of any of the foregoing exhaust nozzle liner assemblies, a portion of the first metal mesh piece is located under the first liner and a portion of the second metal mesh piece is located under the second liner.

In a further embodiment of any of the foregoing exhaust nozzle liner assemblies, includes a retainer having ends. Each of the first metal mesh piece and the second metal piece includes a hook section, and one of the ends of the retainer is received in one of the hook sections.

In a further embodiment of any of the foregoing exhaust nozzle liner assemblies, each of the hook sections include at least one area filled with a braze material.

In a further embodiment of any of the foregoing exhaust nozzle liner assemblies, the seal retainer includes a first seal retainer and a second seal retainer attached to the first liner and the second liner, respectively.

In a further embodiment of any of the foregoing exhaust nozzle liner assemblies, the seal assembly is located between the liners and the seal retainers.

In a further embodiment of any of the foregoing exhaust nozzle liner assemblies, an edge of the first liner and an edge of the second liner contacts the first metal mesh piece and the second metal mesh piece, respectively, during operation of a gas turbine engine to provide a seal.

In a further embodiment of any of the foregoing exhaust nozzle liner assemblies, the seal assembly floats between the liners and the seal retainers when a gas turbine engine is not operating.

In a further embodiment of any of the foregoing exhaust nozzle liner assemblies, the first seal retainer and the second seal retainer each includes a first portion secured to the first liner and the second liner with a fastener, a second portion substantially perpendicular to the first portion, and a third portion that is substantially parallel to the first portion, wherein the third portions retain the seal assembly.

An exhaust nozzle liner assembly of a gas turbine engine according to an exemplary embodiment of this disclosure, among other possible things, includes a first liner, a second liner spaced from the first liner by a gap, and a seal assembly located at least partially within the gap to provide a continuous surface defined by the first liner, the seal assembly and the second liner. The seal assembly includes a first metal mesh piece and a second metal mesh piece connected by and secured to a support plate. A portion of the first metal mesh piece is located under the first liner and a portion of the second metal mesh piece is located under the second liner. Each of the first metal mesh piece and the second metal piece includes a hook section. A retainer has ends. One of the ends of the retainer is received in one of the hook sections. A first seal retainer and a second seal retainer retain the seal assembly. The first retainer and the seal second seal retainer are attached to the first liner and the second liner, respectively.

In a further embodiment of any of the foregoing exhaust nozzle liner assemblies, the support plate is substantially rigid.

In a further embodiment of any of the foregoing exhaust nozzle liner assemblies, each of the hook sections include at least one area filled with braze material.

In a further embodiment of any of the foregoing exhaust nozzle liner assemblies, the seal assembly is located between the liners and the seal retainers.

In a further embodiment of any of the foregoing exhaust nozzle liner assemblies, an edge of the first liner and an edge of the second liner contacts the first metal mesh piece and the second metal mesh piece, respectively, during operation of a gas turbine engine to provide a seal.

In a further embodiment of any of the foregoing exhaust nozzle liner assemblies, the seal assembly floats between the liners and the seal retainers when a gas turbine engine is not operating.

In a further embodiment of any of the foregoing exhaust nozzle liner assemblies, the first seal retainer and the second seal retainer each include a first portion secured to the first liner and the second liner with a fastener, a second portion substantially perpendicular to the first portion, and a third portion that is substantially parallel to the first portion, wherein the third portions retain the seal assembly.

These and other features of the present invention can be best understood from the following specification and drawings, the following of which is a brief description.

DETAILED DESCRIPTION OF THE PREFERRED EMBODIMENTS

Figure 1:
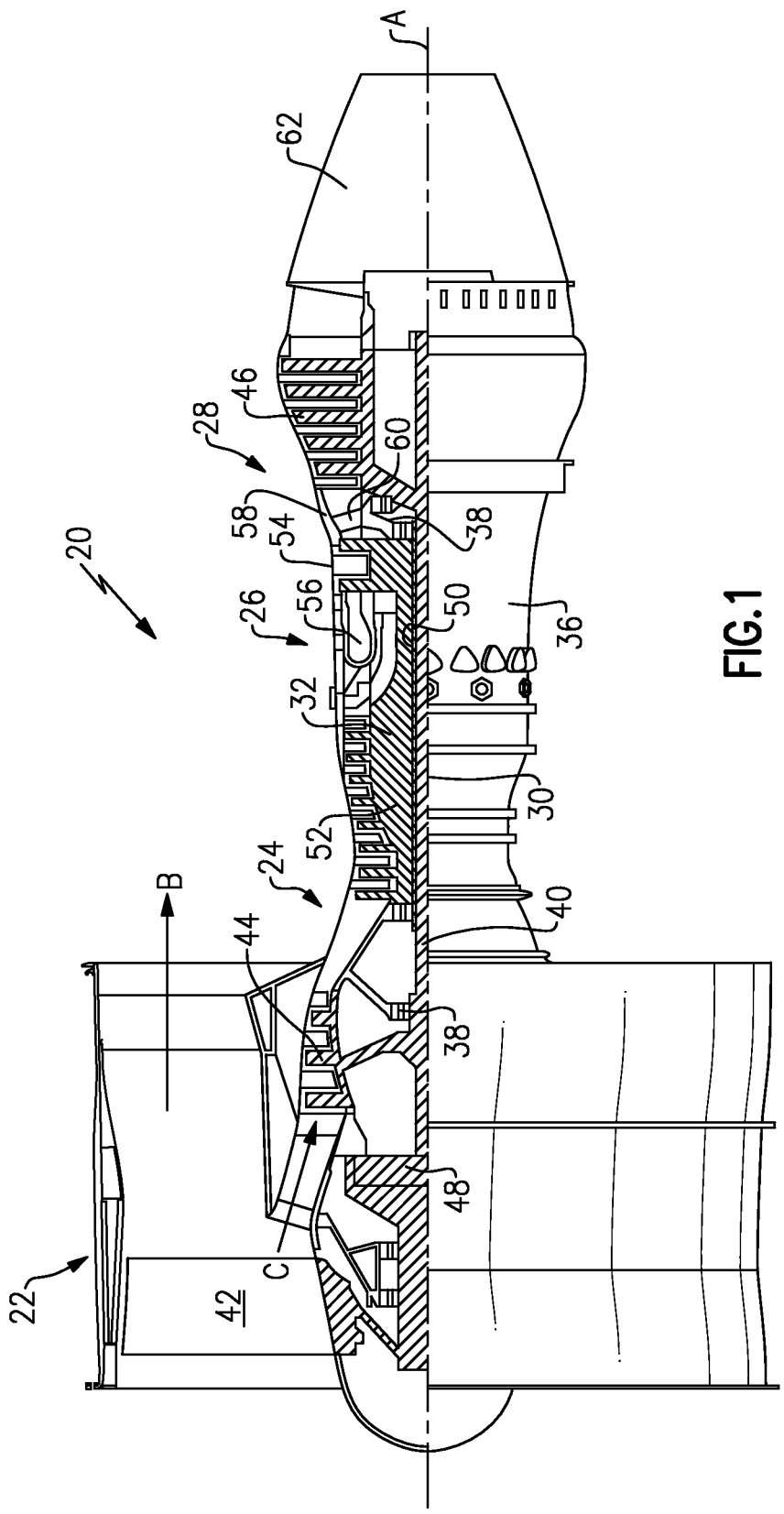
FIG. 1 illustrates a schematic view of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features.

Although depicted as a turbofan gas turbine engine in the disclosed non-limiting embodiment, it should be understood that the concepts described herein are not limited to use with turbofans as the teachings may be applied to other types of turbine engines including three-spool or geared turbofan architectures.

The fan section 22 drives air along a bypass flowpath B while the compressor section 24 drives air along a core flowpath C for compression and communication into the combustor section 26 then expansion through the turbine section 28.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and a high pressure turbine 54.

A combustor 56 is arranged between the high pressure compressor 52 and the high pressure turbine 54.

A mid-turbine frame 58 of the engine static structure 36 is arranged generally between the high pressure turbine 54 and the low pressure turbine 46. The mid-turbine frame 58 further supports bearing systems 38 in the turbine section 28.

The inner shaft 40 and the outer shaft 50 are concentric and rotate via bearing systems 38 about the engine central longitudinal axis A, which is collinear with their longitudinal axes.

The core flowpath C is compressed by the low pressure compressor 44, then the high pressure compressor 52, mixed and burned with fuel in the combustor 56, then expanded over the high pressure turbine 54 and low pressure turbine 46. The mid-turbine frame 58 includes airfoils 60 which are in the core airflow path. The turbines 46, 54 rotationally drive the respective low speed spool 30 and high speed spool 32 in response to the expansion.

The gas turbine engine 20 is in one example a high-bypass geared aircraft engine. In a further example, the gas turbine engine 20 bypass ratio is greater than about six (6:1) with an example embodiment being greater than ten (10:1). The geared architecture 48 is an epicyclic gear train (such as a planetary gear system or other gear system) with a gear reduction ratio of greater than about 2.3 (2.3:1). The low pressure turbine 46 has a pressure ratio that is greater than about five (5:1). The low pressure turbine 46 pressure ratio is pressure measured prior to the inlet of the low pressure turbine 46 as related to the pressure at the outlet of the low pressure turbine 46 prior to an exhaust nozzle 62. The exhaust nozzle 62 is part of a nacelle that converts primary exhaust flow to primary thrust.

In one disclosed embodiment, the gas turbine engine 20 bypass ratio is greater than about ten (10:1), and the fan diameter is significantly larger than that of the low pressure compressor 44. The low pressure turbine 46 has a pressure ratio that is greater than about five (5:1). The geared architecture 48 may be an epicycle gear train, such as a planetary gear system or other gear system, with a gear reduction ratio of greater than about 2.5 (2.5:1). It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the gas turbine engine 20 is designed for a particular flight condition—typically cruise at about 0.8 Mach and about 35,000 feet. The flight condition of 0.8 Mach and 35,000 feet, with the engine at its best fuel consumption, also known as bucket cruise Thrust Specific Fuel Consumption ("TSFC"). TSFC is the industry standard parameter of lbm of fuel being burned divided by lbf of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.45.

"Low corrected fan tip speed" is the actual fan tip speed in feet per second divided by an industry standard temperature correction of $[(Tram\ °\ R)/518.7)^{0.5}]$. The "Low corrected fan tip speed" as disclosed herein according to one non-limiting embodiment is less than about 1150 feet per second (351 meters per second).

Figure 2:
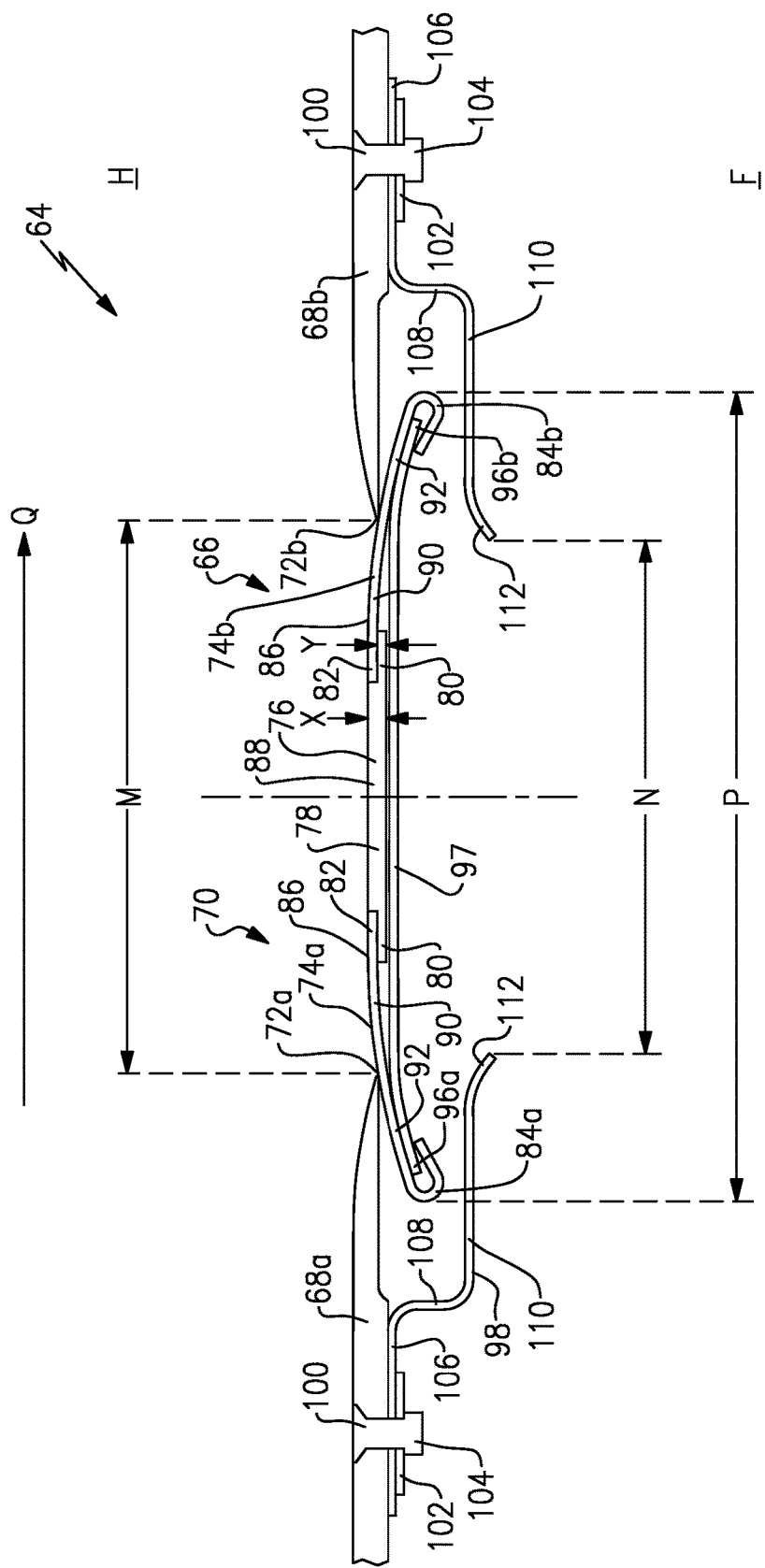
FIG. 2 illustrates a side view of a hot side of an exhaust nozzle liner assembly.
Figure 3:
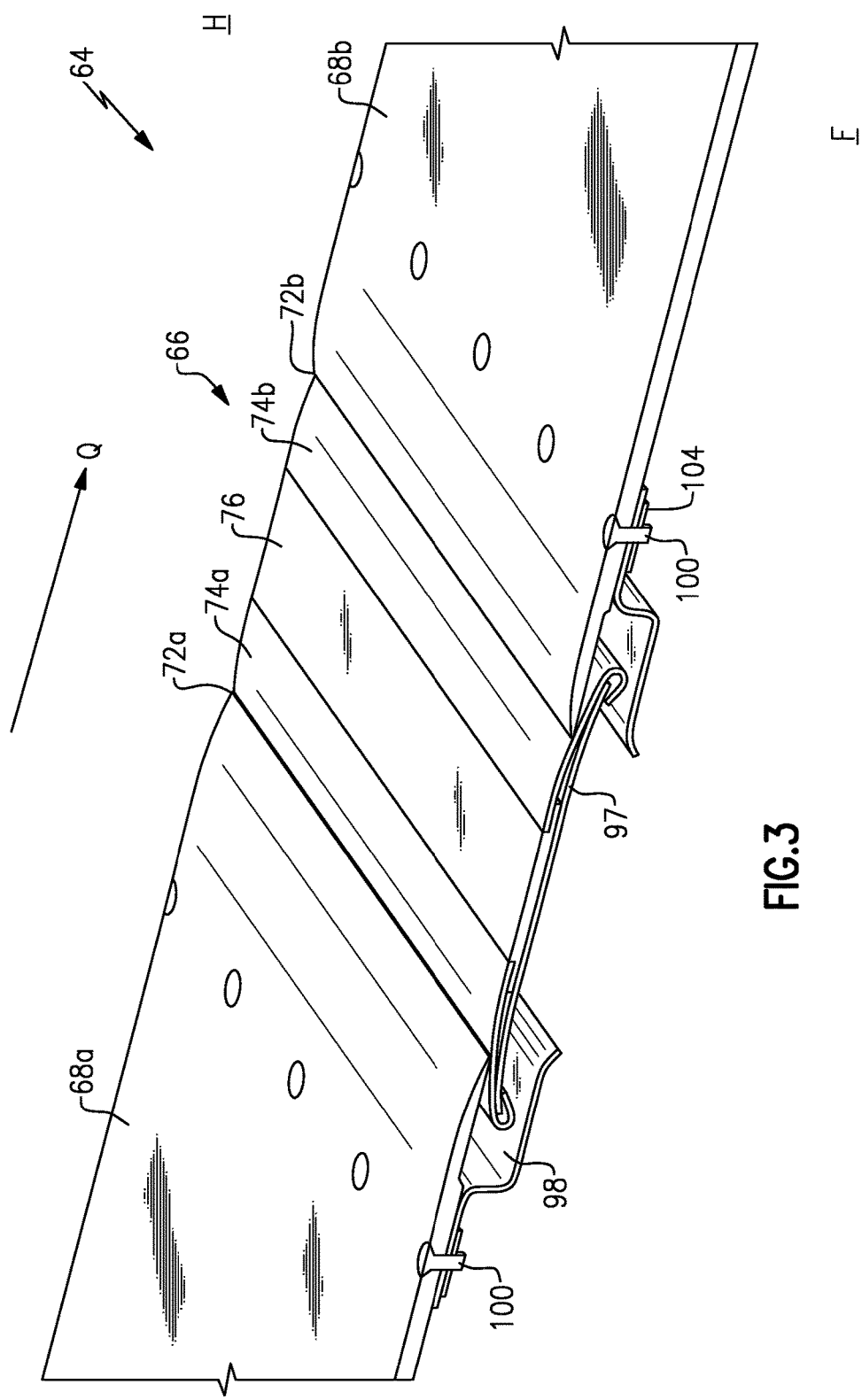
FIG. 3 illustrates a perspective view of the hot side of the exhaust nozzle liner assembly.

FIGS. 2 and 3 illustrate an exhaust nozzle liner assembly 64 of the exhaust nozzle 62. The exhaust nozzle liner assembly 64 includes a hot side H though which gas in a flowpath Q flows and an opposing cold side F. A seal assembly 66 is located between a first liner 68a and a second liner 68b to seal a gap 70 between the two liners 68a and 68b. The gap 70 is defined between edges 72a and 72b of the two liners 68a and 68b, respectively, and has a distance M. In one example, the liners 68a and 68b are made of nickel alloy. The liners 68a and 68b are located over a casing (not shown). In one example, the casing is made of titanium.

The seal assembly 66 includes two woven metal cloth mesh pieces 74a and 74b that each are associated with and engages one of the liners 68a and 68b, respectively. The two woven metal cloth mesh pieces 74a and 74b are spaced apart from each other and connected by a support plate 76. The support plate 76 is secured to the two woven metal cloth mesh pieces 74a and 74b to define the seal assembly 66. The support plate 76 is rigid and made of metal to provide strength and structure. The woven metal cloth mesh pieces 74a and 74b are allowed a small amount of displacement to seat against mating surface on the liners 68a and 68b, eliminating any edge gaps.

In another example, the seal assembly 66 is made of one piece of woven metal cloth mesh. In this example, the two woven metal cloth mesh pieces 74a and 74b and the support plate 76 described above are combined into a single component to define the seal assembly 66.

The woven metal cloth mesh pieces 74a and 74b can be made of any metal that can be drawn into fine wire and woven together to form a cloth mesh. The specific metal depends on the operating environment. In one example, the metal is L-605, a cobalt based alloy used in high temperature exhaust systems. The woven metal cloth mesh pieces 74a and 74b can be formed of a single layer or formed of multiple layers, depending upon the stiffness or porosity desired. The woven metal cloth mesh pieces 74a and 74b allow the seal assembly 66 to conform to the complex gas path geometry and compound bends in the exhaust nozzle 62. In one example, braze material can be added to the woven metal cloth mesh pieces 74a and 74b to provide additional structure. In another example, local areas of the woven metal cloth mesh pieces 74a and 74b can be solidified with braze material to act as wear plates.

The support plate 76 includes a central portion 78 having a thickness X and opposing end regions 80 having a thickness Y. The thickness Y is less than the thickness X.

Each woven metal cloth mesh piece 74a and 74b includes an inner end section 82 and a hook shaped outer end section 84. The inner end section 82 of each of the woven metal cloth mesh pieces 74a and 74b overlap with and are secured to one of the opposing end regions 80 of the support plate 76. In one example, the support plate 76 can be secured to the two woven metal cloth mesh pieces 74a and 74b by brazing, welding or adhesive bonding. The type of bonding material can depend on the operating temperature.

Once the woven metal cloth mesh pieces 74a and 74b and the support plate 76 are assembled to form the seal assembly 66, the seal assembly 66 is located between the liners 68a and 68b, filling the gap 70. An upper surface 86 of the woven metal cloth mesh pieces 74a and 74b and an upper surface 88 of the support plate 76 are flush, creating a smooth surface over which the air in the flowpath Q flows.

A first portion 90 of each of the woven metal cloth mesh pieces 74a and 74b (including the inner end sections 82) is located in the gap 70, and a second portion 92 (including the hook shaped outer end sections 84) of each of the woven metal cloth mesh pieces 74a and 74b is located under one of the liners 68a and 68b, respectively. The edges 72a and 72b of each of the liners 68a and 68b, respectively, engage the upper surface 86 of one of each of the woven metal cloth mesh pieces 74a and 74b, respectively. An outermost surface of the hook shaped outer sections 84a and 84b of the woven metal cloth mesh pieces 74a and 74b, respectively, are spaced apart by a distance P.

A retainer 97 is located outwardly of the support plate 76. The retainer 97 includes two end regions 96a and 96b that are each received in one of the hook shaped outer sections 84a and 84b, respectively, of the woven metal cloth mesh pieces 74a and 74b, respectively. In one example, the retainer 97 is made of sheet metal.

The retainer 97 adds structure to the seal assembly 66. There is a tendency for the woven metal cloth mesh pieces 74a and 74b to be pulled inwardly towards the gas in the flowpath Q, and the structure and rigidity provided by the retainer 97 helps to prevent this. Additionally, the distance P between the hook shaped outer sections 84a and 84b is much greater then the width M between the edges 72a and 72b of the liners 68a and 68b, respectively, that define the gap 70 also preventing the seal assembly 66 from being pulled inwardly. The retainer 97 can be a continuous structure or formed of a plurality of pieces.

Figure 4:
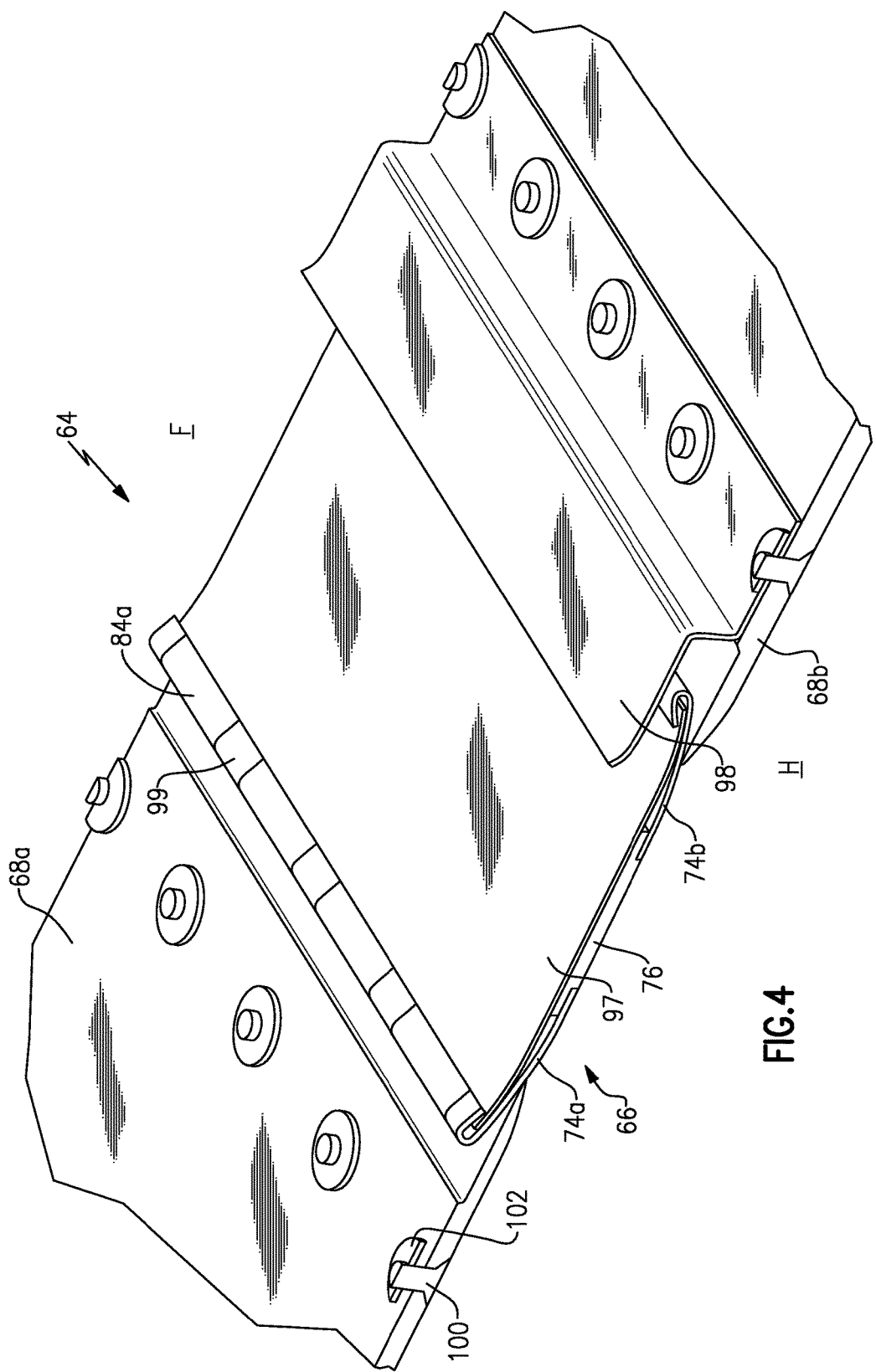
FIG. 4 illustrates a perspective view of a cold side of the exhaust nozzle liner assembly with a seal retainer removed.

As shown in FIG. 4, with a portion of a seal retainer 98 removed (discussed below), portions 99 of the hook shaped outer sections 84a and 84b of the woven metal cloth mesh pieces 74a and 74b, respectively, can be locally solidified with a braze material to retain the woven metal cloth mesh pieces 74a and 74b when pressurized. By locating the braze material intermittently in sections along the hook shaped outer sections 84a and 84b, the woven metal cloth mesh pieces 74a and 74b can follow the geometry of the complex gas path. Also, applying braze in the tip and wear area can be made intermittent to allow the woven metal cloth mesh pieces 74a and 74b to wrap around corners.

The seal retainer 98 retains the seal assembly 66 and allows the seal assembly 66 to float between the seal retainer 98 and the liners 68a and 68b. In one example, the seal retainer 98 is made of a nickel alloy. In one example, the seal retainer 98 is made of sheet metal. One seal retainer 98 is attached to each of the liners 68a and 68b with a plurality of fasteners 100. In one example, the fasteners 100 are rivets. A washer 102 is located between the seal retainer 98 and a head 104 of the fastener 100. In another example, the seal retainer 98 is secured to the liners 68a and 68b by welding or brazing.

Each seal retainer 98 includes a first portion 106 that is attached to one of the liners 68a and 68b by the fasteners 100. Each seal retainer 98 also includes a second portion 108 that is substantially perpendicular to the first portion 106 and extends outwardly and away from the liners 68a and 68b and the flowpath Q, and each seal retainer 98 includes a third portion 110 that is substantially parallel to the first portion 106 and having a curved end section 112. The third portions 110 extend inwardly. The third portions 110 of the seal retainers 94 are separated by a distance N. The distance N is less than the distance P between the hook shaped outer sections 84a and 84b, retaining the seal assembly 66 between the seal retainer 98 and the liners 68a and 68b and allowing the seal assembly 66 to float during operation of the gas turbine engine 20.

The seal assembly 66 eliminates gaps to provide a smooth gas path surface with minimal discontinuity. The woven metal cloth mesh pieces 74a and 74b can accommodate complex curves, and the ability of the seal assembly 66 to float accommodates delta thermal growth and manufacturing or misalignment tolerances. As the seal retainer 98 is located on the cold side F, the woven metal cloth mesh pieces 74a and 74b are prevented from blowing into the flowpath Q and allows for great flexibility in sizing and material choices. Additionally, the seal assembly 66 is replaceable and customizable. The back side of the sheet metal seal retainer 98 can also be segmented to follow contoured surfaces.

In another example, a resilient member can be employed between the seal assembly 66 and the liners 68a and 68b. In one example, the resilient member is a leaf spring. The resilient member maintains contact of the seal assembly 66 with the liners 68a and 68b during low pressure operation conditions or when the gas turbine engine 20 is not operating.

Although the liners 68a and 68b and the seal assembly 66 are shown as two dimensional and in the shape of a plate, the features can be three dimensional and in the shape of a ring.

Although a gas turbine engine 20 with geared architecture 48 is described, the seal assembly 66 can be employed in a gas turbine engine without geared architecture.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. An exhaust nozzle liner assembly of a gas turbine engine comprising:
a first liner;
a second liner spaced from the first liner by a gap;
a seal assembly located at least partially within the gap to provide a continuous surface defined by the first liner, the seal assembly and the second liner, wherein the seal assembly includes a first metal mesh piece and a second metal mesh piece;
a seal retainer to retain the seal assembly;
a support plate located between the first metal mesh piece and the second metal mesh piece, wherein the first metal mesh piece and the second metal mesh piece are connected by and secured to the support plate, and the first metal mesh piece, the second metal mesh piece, and the support plate are separate components, wherein a portion of the support plate is exposed to a gas flowpath and uncovered by the first metal mesh piece and the second metal mesh piece; and
a support retainer having ends, wherein each of the ends of the support retainer engage one of the first metal mesh piece and the second metal mesh piece.

2. The exhaust nozzle liner assembly as recited in claim 1 wherein the support plate is rigid.

3. The exhaust nozzle liner assembly as recited in claim 1 wherein a braze material is added to the first metal mesh piece and the second metal mesh piece.

4. The exhaust nozzle liner assembly as recited in claim 1 wherein a portion of the first metal mesh piece is located under the first liner and a portion of the second metal mesh piece is located under the second liner.

5. The exhaust nozzle liner assembly as recited in claim 1 wherein the seal retainer comprises a first seal retainer and a second seal retainer attached to the first liner and the second liner, respectively.

6. The exhaust nozzle liner assembly as recited in claim 5 wherein the first liner and the second liner define a gapped liner assembly, the first seal retainer and the second seal retainer define a seal retainer assembly, and the seal assembly is located between the gapped liner assembly and the seal retainer assembly.

7. The exhaust nozzle liner assembly as recited in claim 6 wherein an edge of the first liner and an edge of the second liner contacts the first metal mesh piece and the second metal mesh piece, respectively to provide a seal.

8. The exhaust nozzle liner assembly as recited in claim 6 wherein the seal assembly floats between the gapped liner assembly and the seal retainer assembly.

9. The exhaust nozzle liner assembly as recited in claim 5 wherein the first seal retainer and the second seal retainer each includes a first portion, a second portion and a third portion, wherein the first portion of the first seal retainer is secured to the first line with a first fastener and the first portion of the second seal retainer is secured to the second liner with a second fastener, the second portion of the first seal retainer is perpendicular to the first portion of the first seal retainer and the second position of the second seal retainer is perpendicular to the first portion of the second seal retainer, and the third portion of the first seal retainer is parallel to the first portion of the first seal retainer and the third portion of the second seal retainer is parallel to the first portion of the second seal retainer, wherein the third portion of the first seal retainer and the third portion of the second seal retainer retain the seal assembly.

10. The exhaust nozzle liner assembly as recited in claim 1 wherein the first liner and the second liner are planar.

11. The exhaust nozzle liner assembly as recited in claim 1 wherein the seal retainer is attached to the first liner and the second liner.

12. The exhaust nozzle liner assembly as recited in claim 1 wherein the first liner and the second liner define a gapped liner assembly, and the seal assembly is located between the gapped liner assembly and the seal retainer.

13. The exhaust nozzle liner assembly as recited in claim 1 wherein a portion of the support plate is located between the first metal mesh piece and the support retainer and another portion of the support plate is located between the second metal mesh piece and the support retainer.

14. The exhaust nozzle liner assembly as recited in claim 1 wherein the support retainer prevents the first metal mesh piece and the second metal mesh piece from pulling towards the gas flowpath.

15. The exhaust nozzle liner assembly as recited in claim 1 wherein the support plate is substantially planar.

16. An exhaust nozzle liner assembly of a gas turbine engine comprising:
a first liner;
a second liner spaced from the first liner by a gap;
a seal assembly located at least partially within the gap to provide a continuous surface defined by the first liner, the seal assembly and the second liner, wherein the seal assembly includes a first metal mesh piece and a second metal mesh piece;
a seal retainer to retain the seal assembly;
a support plate located between the first metal mesh piece and the second metal mesh piece, wherein the first metal mesh piece and the second metal mesh piece are connected by and secured to the support plate, and the first metal mesh piece, the second metal mesh piece, and the support plate are separate components; and
a support retainer having ends, wherein each of the first metal mesh piece and the second metal mesh piece includes a hook section, and one of the ends of the support retainer is received in one of the hook sections.

17. The exhaust nozzle liner assembly as recited in claim 16 wherein each of the hook sections include at least one area filled with a braze material.

18. An exhaust nozzle liner assembly of a gas turbine engine comprising:
a first liner;
a second liner spaced from the first liner by a gap;
a seal assembly located at least partially within the gap to provide a continuous surface defined by the first liner, the seal assembly and the second liner, wherein the seal assembly includes a first metal mesh piece and a second metal mesh piece connected by and secured to a support plate, a portion of the first metal mesh piece is located under the first liner and a portion of the second metal mesh piece is located under the second liner, and each of the first metal mesh piece and the second metal mesh piece includes a hook section;
a support retainer having ends, wherein one of the ends of the support retainer is received in one of the hook sections;
a first seal retainer and a second seal retainer to retain the seal assembly, wherein the first seal retainer and the second seal retainer are attached to the first liner and the second liner, respectively.

19. The exhaust nozzle liner assembly as recited in claim 18 wherein the support plate is rigid.

20. The exhaust nozzle liner assembly as recited in claim 18 wherein each of the hook sections include at least one area filled with braze material.

21. The exhaust nozzle liner assembly as recited in claim 18 wherein the first liner and the second liner define a gapped liner assembly, the first seal retainer and the second seal retainer define a seal retainer assembly, and the seal assembly is located between the gapped liner assembly and the seal retainer assembly.

22. The exhaust nozzle liner assembly as recited in claim 21 wherein an edge of the first liner and an edge of the second liner contacts the first metal mesh piece and the second metal mesh piece, respectively to provide a seal.

23. The exhaust nozzle liner assembly as recited in claim 21 wherein the seal assembly floats between the gapped liner assembly and the seal retainer assembly.

24. The exhaust nozzle liner assembly as recited in claim 18 wherein the first seal retainer and the second seal retainer each include a first portion, a second portion and a third portion, wherein the first portion of the first seal retainer is secured to the first liner with a first fastener and the first portion of the second seal retainer is secured to the second liner with a second fastener, the second portion perpendicular of the first seal retainer is perpendicular to the first portion of the first seal retainer and the second portion of the second seal retainer is perpendicular to the first portion of the second seal retainer, and the third portion of the first seal retainer is parallel to the first portion of the first seal retainer and the third portion of the second seal retainer is parallel to the first portion of the second seal retainer, wherein the third portion of the first seal retainer and the third portion of the second seal retainer retain the seal assembly.

* * * * *

UNITED STATES PATENT AND TRADEMARK OFFICE
CERTIFICATE OF CORRECTION

PATENT NO.        : 9,771,895 B2
APPLICATION NO.   : 13/653590
DATED             : September 26, 2017
INVENTOR(S)       : George J. Kramer It is certified that error appears in the above-identified patent and that said Letters Patent is hereby corrected as shown below:

In the Claims

In Claim 9, Column 7, Line 47; before "with a first fastener" replace "the first line" with --the first liner--

In Claim 24, Column 9, Line 14; after "the second portion" delete "perpendicular"

Signed and Sealed this
Twenty-fourth Day of July, 2018

Andrei Iancu
*Director of the United States Patent and Trademark Office*